US009311597B2

(12) United States Patent
Cantin

(10) Patent No.: US 9,311,597 B2
(45) Date of Patent: Apr. 12, 2016

(54) EARLY GENERATION OF INDIVIDUALS TO ACCELERATE GENETIC ALGORITHMS

(71) Applicant: International Business Machines Corporation, Armonk, NY (US)

(72) Inventor: Jason F. Cantin, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 13/795,165

(22) Filed: Mar. 12, 2013

(65) Prior Publication Data

US 2014/0279765 A1 Sep. 18, 2014

(51) Int. Cl.
*G06N 3/12* (2006.01)

(52) U.S. Cl.
CPC ........................................ *G06N 3/126* (2013.01)

(58) Field of Classification Search
None
See application file for complete search history.

(56) References Cited

U.S. PATENT DOCUMENTS

| | | | |
|---|---|---|---|
| 5,897,629 A | 4/1999 | Shinagawa et al. | |
| 2004/0210545 A1* | 10/2004 | Branke et al. | 706/45 |
| 2010/0293119 A1 | 11/2010 | Ferringer et al. | |
| 2010/0293313 A1* | 11/2010 | Ferringer et al. | 710/110 |
| 2011/0270528 A1 | 11/2011 | Lubomirski et al. | |
| 2012/0016819 A1 | 1/2012 | Walker | |

FOREIGN PATENT DOCUMENTS

| | | |
|---|---|---|
| CN | 1450493 | 10/2003 |
| CN | 102300269 | 12/2011 |
| CN | 102866912 | 1/2013 |

OTHER PUBLICATIONS

Nowostawski, M., et al. "Parallel genetic algorithm taxonomy." Knowledge-Based Intelligent Information Engineering Systems, 1999. Third International Conference. IEEE, 1999.*
Wiese, K., et al. "P-RnaPredict-a parallel evolutionary algorithm for RNA folding: effects of pseudorandom number quality." NanoBioscience, IEEE Transactions on 4.3 (2005): 219-227.*
"International Search Report", 11 pages.
Deb, Kalyanmoy et al., "A Fast Elitist Non-Dominated Sorting Genetic Algorithm for Multi-Objective Optimization: NSGA-II", KanGAL Report No. 200001 http://www.iitk.ac.in/kangal 2000, 1-11 pages.
Miller, Brad L. et al., "Genetic Algorithms, Tournament Selection, and the Effects of Noise", IlliGAL Report No. 95006 Jul. 1995, 1-14 pages.
Muhlenbein, H , "Parallel Genetic Algorithms, Population Genetics and Combinatorial Optimization", 1989, pp. 398-406.

* cited by examiner

*Primary Examiner* — Kakali Chaki
*Assistant Examiner* — Eric Nilsson
(74) *Attorney, Agent, or Firm* — DeLizio Law, PLLC

(57) ABSTRACT

While at least one candidate solution of a first generation of candidate solutions remains to be evaluated in accordance with a fitness function for an optimization problem, a plurality of candidate solutions is selected from the first generation of candidate solutions to participate in a tournament. It is determined whether each of the plurality of candidate solutions selected to participate in the tournament have been evaluated in accordance with the fitness function. If all have been evaluated, then one or more winners of the tournament are selected from the plurality of candidate solutions of the first generation of candidate solutions. A candidate solution of a second generation of candidate solutions is created with the selected one or more winners of the tournament in accordance with a genetic operator.

18 Claims, 10 Drawing Sheets

EARLY GENERATION OF INDIVIDUALS TO ACCELERATE GENETIC ALGORITHMS

BACKGROUND

Embodiments of the inventive subject matter generally relate to the field of computing, and, more particularly, to metaheuristic optimization.

Software tools employ metaheuristic optimization algorithms to solve optimization problems. Examples of metaheuristic optimization algorithms include evolutionary algorithms (e.g., genetic algorithm, differential evolution), ant colony optimization algorithms, simulated annealing algorithms, etc.

Evolutionary algorithms use techniques loosely based on Darwinian evolution and biological mechanisms to evolve solutions to design problems. A software tool that implements an evolutionary algorithm starts with a randomly generated population of solutions, and iteratively uses recombination, crossover, mutation, and the Darwinian principles of natural selection to create new, more fit solutions in successive generations. Evolutionary algorithms have been deployed in many aspects of research and development, and have generated human-competitive solutions to a wide range of problems.

SUMMARY

Embodiments of the inventive subject matter include early construction of candidate solutions. While at least one candidate solution of a first generation of candidate solutions remains to be evaluated in accordance with a fitness function for an optimization problem, a plurality of candidate solutions is selected from the first generation of candidate solutions to participate in a tournament. It is determined whether each of the plurality of candidate solutions selected to participate in the tournament have been evaluated in accordance with the fitness function. If all have been evaluated, then one or more winners of the tournament are selected from the plurality of candidate solutions of the first generation of candidate solutions. A candidate solution of a second generation of candidate solutions is created with the selected one or more winners of the tournament in accordance with a genetic operator.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
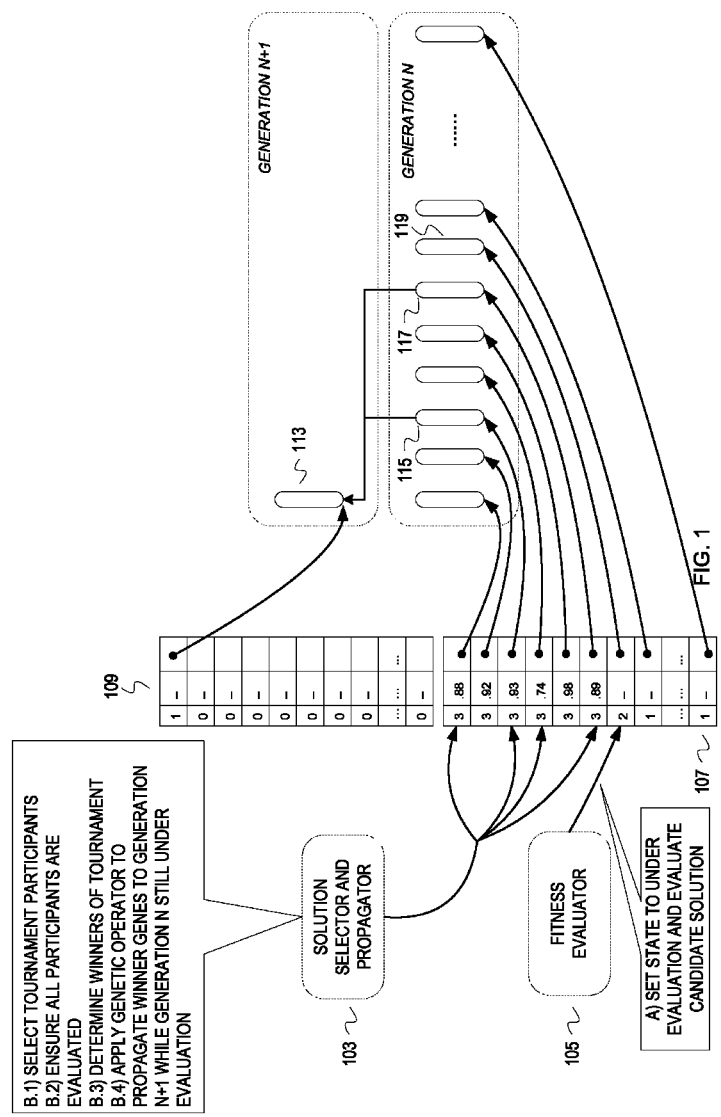
FIG. 1 depicts a conceptual diagram of an example genetic algorithm process with accelerated individual construction.

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Terminology

Literature about evolutionary computing uses a large variety of terminology. In some cases, terms are used ambiguously. A "candidate solution" can be program code, a data structure of actual parameters (e.g., vector or array of actual parameters), or both. In this description, a candidate solution is used to refer to a data structure of actual parameters. This description uses the terms "formal parameters" and "actual parameters" instead of variable and argument. For example, a formal parameter is signal delay and the corresponding actual parameter may be 5 microseconds. A candidate solution is also referred to as an individual.

Genetic algorithm literature sometimes uses the terms "population" and "generation" ambiguously. A software tool or computer program that implements an evolutionary algorithm to solve an optimization problem iteratively creates candidate solutions, computes fitness values for the candidate solutions, and evaluates the candidate solutions to determine whether a next iteration should begin. This description sometimes refer to the aggregate of computing fitness value for a candidate solution and evaluating the computed fitness value as evaluating fitness of the candidate solution. The candidate solutions created at a particular iteration are referred to as a generation of candidate solutions or generation, a population of candidate solutions, or a population of candidate solutions of a generation.

An evolutionary simulation or run may operate on a single deme model or a multi-deme model. A deme refers to a local population unit. In a multi-deme model, a population of candidate solutions is separated into sub-populations. Candidate solutions do not mix between demes of sub-populations unless migration is implemented. When separated into sub-populations, the term "generation" typically refers to all of the sub-populations in that generation. The specification will sometimes use the term "sub-population generation" to refer to a generation of one of the sub-populations. The term "population" also refers to the aggregate of candidate solutions across generations. Similarly, the term "sub-population" refers to the aggregate of candidate solutions managed by a deme manager across generations.

The specification will also use the term "iteration." Iteration is used to refer to a stage in the evolutionary algorithm based computing process, instead of generation. The term "process" is often used to refer to an instantiation of a sequence of machine-readable program instructions. The term "evolutionary algorithm process" and "evolutionary process" are used herein to refer to a process(es) that implements an evolutionary algorithm (e.g., a genetic algorithm). The term "evolutionary algorithm process" is not limited to a single instance of executing instructions. The term "genetic algorithm process" is also used in the same manner as "evolutionary algorithm process." The term "node" or "computing node" is used herein to refer to a computing resource unit. Examples of a node include a computer, a mobile device, a virtual machine, a core in a multi-core environment, a processor in a multi-processor environment, a group of computers in a cluster, a group of computers in a grid, etc.

Finally, this description uses a semantic that refers to a tournament being conducted in a source generation. For instance, tournament participants are selected from generation N for early construction of an individual or candidate solution in generation M. The tournament is described as being conducted in generation N for early construction of an individual in generation M. The parameters are maintained in the example illustrations in accordance with this semantic. This semantic should not have any impact on embodiments or claim scope.

Introduction

Efficient generation of candidate solutions can improve performance of an evolutionary algorithm program. Conventionally, an entire generation is evaluated utilizing a fitness function before candidate solutions are generated for the next generation. Fitness of the candidate solutions of a current generation are evaluated with a fitness function, and the candidate solutions are ranked according to fitness. This creates an efficiency issue when the fitness function is complex because the additional time for fitness evaluation also increases the time until candidate solutions can be constructed for the next generation. Possible hardware and software failures can make the problem acute because hardware and software failures may incur retries in fitness evaluation. The entire evolutionary process is held up until the very last individual of the population or sub-population has been evaluated. In addition, individual variations in candidate solutions lead to varying times for fitness evaluation. In the case of a single deme model, the time per generation is the maximum time to evaluate any one individual. In the case of a multi-deme model, the time per generation per sub-population is the maximum time to evaluate any one individual within the corresponding deme. Although there is some tolerance of individual variations because other demes may advance to the next generation, the time for the evolutionary computing process to complete N generations is no less than the time for the slowest of the demes to complete N generations.

To reduce the time per generation, candidate solution construction can begin while a current generation is still under evaluation. Candidate solutions from the generation undergoing evaluation are selected using tournament selection for incremental construction of candidate solutions for a next generation. If candidate solutions from the generation undergoing evaluation are available to conduct the tournament, a winner or winners of the tournament are used to construct a candidate solution for the next generation. This early construction (or accelerated construction) prevents a small number of current generation candidate solutions from stalling the construction of the next generation. Although this early construction technique speculates that the evolutionary process will not terminate with the current generation, the early construction does not speculate with respect to fitness. Since tournament participants are selected based on actual fitness instead of speculative fitness, resources are not wasted evaluating erroneous candidate solutions constructed based on mis-predictions about fitness, and rollback is avoided.

FIG. 1 depicts a conceptual diagram of an example genetic algorithm process with accelerated individual construction. The conceptual diagram depicts a solution selector and propagator 103 and a fitness evaluator 105. These represent processes that carry out different aspects of the genetic algorithm process. The fitness evaluator 105 applies a fitness function to each individual, and generates a fitness value that represents fitness of the individual. The metric and form of the fitness value can vary based on any one of the optimization problem, design of the genetic algorithm process, etc. In this example, the fitness values are expressed as decimal numbers that can be interpreted as degree of fitness from 0 to 100%. The solution selector and propagator 103 selects individuals to participate in a tournament, and creates individuals based on the tournament outcome. The solution selector and propagator 103 and the fitness evaluator 105 are likely, but not necessarily, hosted on different computing nodes.

The solution selector and propagator 103 and the fitness evaluator 105 operate upon example data structures 107, 109. Each of the data structures 107, 109 correspond to a different generation. The structure 107 corresponds to a generation N and the structure 109 corresponds to a generation N+1. Each of the structures 107, 109 include three columns. Each entry in a first column indicates state of an individual. For this illustration, the values 0-3 represent evaluation state as follows:

0=Not Constructed
1=Constructed, Not Evaluated
2=Under Evaluation
3=Evaluated

Additional states can be maintained to indicate, for example, whether the individual failed the fitness evaluation. Each entry in a second column of the structures indicates fitness values generated from the fitness evaluation. Each entry in a third column contains a reference or pointer to an individual. Entries in the third column of the data structure 107 reference individuals in generation N. Entries in the third column of the data structure 109 reference individuals in generation N+1. In this example illustration, all individuals of generation N have been constructed, and generation N is the generation currently under evaluation.

In FIG. 1, several stages are depicted. The different stages are used to delineate different operations, and are not to be used to limit any embodiments to the particular order illustrated. Furthermore, the stages are a snapshot of example operations that occur during an evolutionary process. For this illustration, a stage A is depicted for the fitness evaluator 105. FIG. 1 depicts stages B.1 through B.4 for the solution selector and propagator 103.

At stage A, the fitness evaluator 105 sets state for an individual 119 in generation N to indicate "Under Evaluation," and begins evaluating fitness of the individual 119. Setting state, however, may be performed by a process or node different than the process or node that performs the fitness evaluation. A process or node that has access to the structure 107 can set the state to indicate "Under Evaluation" and then send the individual 119 or a reference to the individual 119 to the node or process that actually performs the fitness evaluation.

Over the series of B stages, the solution selector and propagator (hereinafter "propagator") 103 conducts a tournament and constructs an individual of generation N+1. At stage B.1, the propagator 103 selects tournament participants for a tournament. The propagator 103 randomly selects tournament participants from generation N. In this illustration, individuals 0, 2, 3, and 5 are selected for the tournament. At stage B.1, the propagator 103 ensures that all of the selected participants have been evaluated. The propagator 103 reads the evaluation state and verifies that all participants have a state of "Evaluated." In some cases, all selected tournament participants may not be evaluated. If any one of the selected tournament participants is not evaluated, then the tournament is not conducted. Since all of the selected tournament participants have been evaluated, the propagator 103 determines two winners of the tournament at stage B.3. The winners of the tournament are individuals 115, 117. Within the tournament, the individual 115 has the highest fitness value of 0.93, and the individual 117 has the second highest fitness value of 0.89. Although this example presumes two winners are selected from a tournament, embodiments can vary. A tournament may only have a single winner. If the genetic operator requires multiple individuals (e.g., crossover), then a tournament can be conducted for each required individual. At stage B.4, the propagator 103 applies the genetic operator to the individuals 115, 117 to propagate their genes to generation N+1 while generation N is still under evaluation. The propagator 103 constructs individual 113 in generation N+1 from applying the genetic operator to individual 115 and individual 117.

As noted in the description of FIG. 1, embodiments may not conduct a tournament when a tournament participant has not yet been evaluated. When a tournament cannot be conducted because an individual has not been evaluated, embodiments can wait until the participant is evaluated, or advance to another future generation. In either case, the random numbers used for selecting the tournament participants can be stored or discarded. If discarded, perhaps to conserve resources, repeatability is preserved by incorporating an indication of the generation into a seed(s) for a pseudo-random number generator (PRNG). The seed is used to ensure the same random numbers are generated for a particular generation. A typical seed is used to initialize internal state of a PRNG. Typically, a PRNG initializes an internal state based on a seed and updates that state over time. To ensure the same sequence of random numbers is generated per generation, the seed incorporates an indication of the generation so that each generation has a unique seed. In the case of a multiple deme model, each deme per generation has a unique seed. The seed per deme per generation (deme_gen_seed) could be computed in accordance with the following function:

$$deme\_gen\_seed=(G*N+D)+S,$$

where G corresponds to generation, N corresponds to number of demes, D corresponds to a deme, and S corresponds to an initial random seed.

Additional variations are possible for distinguishing seeds, for example per individual. Variations of functions to compute the seed to initialize the PRNG are also possible as long as seeds to initialize the PRNG are unique across generations per population unit and preserve repeatability.

Figure 2:
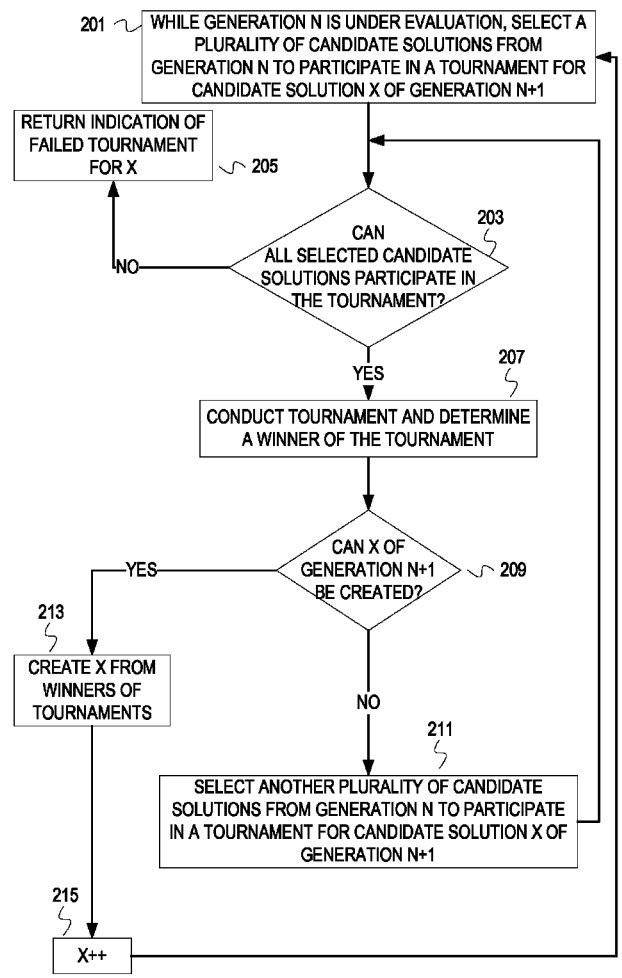
FIG. 2 depicts a flowchart of example operations for early construction of individuals in an evolutionary process.

FIG. 2 depicts a flowchart of example operations for early construction of individuals in an evolutionary process.

At block 201, a plurality of candidate solutions are selected from a generation N to participate in a tournament for a candidate solution X of generation N+1. The participants are selected while there is at least one candidate solution to be evaluated in generation N. A designer/developer of the evolutionary program defines the number of participants of a tournament in dependence upon the biological operation used for creating candidate solution X. For instance, the number of participants should be at least 2 if the biological operation is crossover.

At block 203, it is determined if all of the selected candidate solutions can participate in the tournament. A candidate solution that has failed evaluation cannot participate in the tournament. In addition, a candidate solution may not be viable (e.g., the candidate solution may not be acceptable input for a simulator). If the tournament cannot be conducted with the selected participants, then control flows to block 205. Otherwise, control flows to block 207.

At block 205, an indication of the failed tournament is returned. The failed tournament indication notifies the process (e.g., a deme manager) that requested the early construction that the tournament could not be conducted. The deme manager can then wait to request early construction of individual X again.

At block 207, the tournament is conducted and a winner of the tournament is determined. Although this flowchart of example operations presumes a tournament designed to produce a single winner, embodiments can conduct a tournament that produces multiple winners, perhaps winners sufficient to create the individual to be constructed early.

At block 209, it is determined if candidate solution X of generation N+1 can be created. The early construction process determined whether the tournaments have yielded enough candidate solution of generation N to create individual X in accordance with the corresponding biological operation. If sufficient winners have not been yielded, then control flows to block 211. If sufficient winners have been yielded from the tournaments, then control flows to block 213.

At block 213, individual X is created from the tournament winners.

At block 215, a counter X is incremented to indicate a next individual of generation N+1 for early construction. Control flows from block 215 back to block 201. Embodiments may allow the early construction process to continue until interrupted by, for example, a deme manager or evolutionary process manager, or embodiments may return to the calling process (e.g., deme manager) after early construction of a given number of individuals.

If the individual X could not yet be constructed at block 209, then another plurality of candidate solutions is selected from generation N at block 211 for another tournament. Control flows from block 211 back to block 203.

Figure 3:
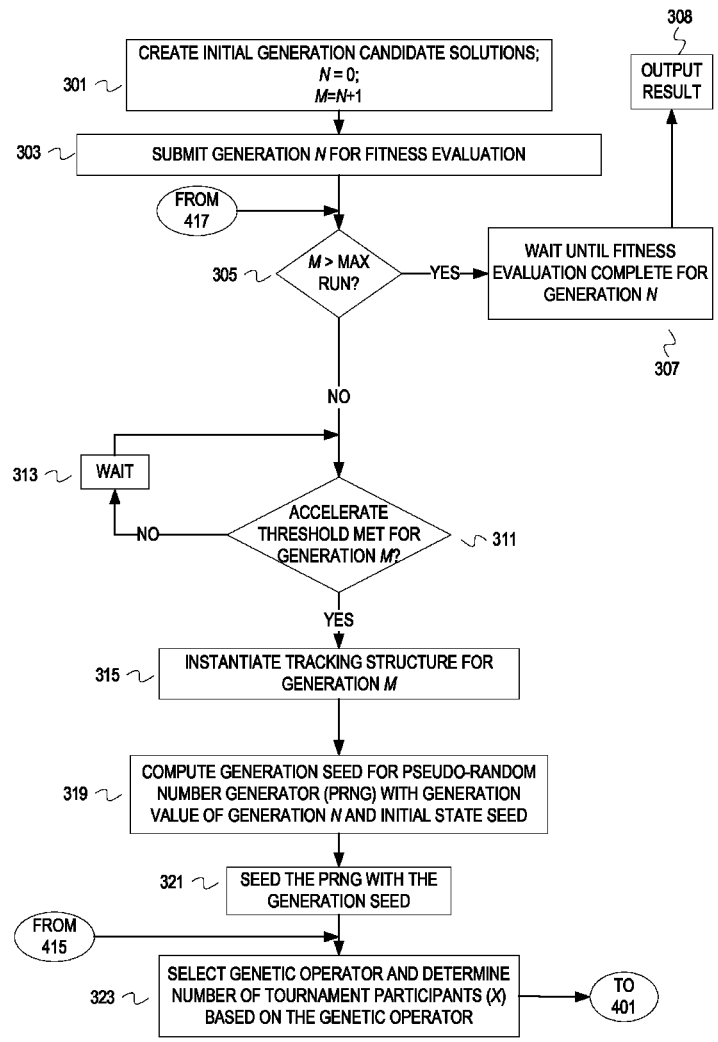
FIGS. 3-4 depict flowcharts of example operations for early construction of individuals in an evolutionary process with PRNG seeding.
Figure 4:
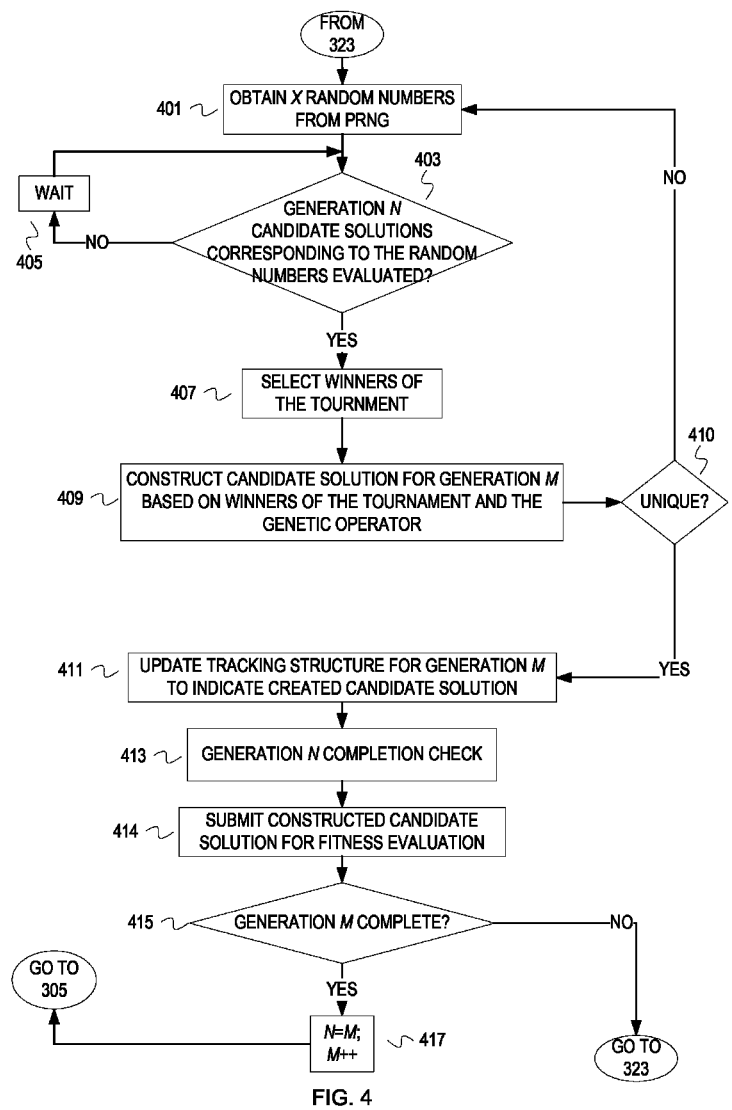

Selection of candidate solutions to participate in tournaments is done in a repeatable or reproducible manner in case the tournament fails. Random selection of candidate solutions as tournament participants can be reproducible by manipulating seeding of a random number generator. FIGS. 3-4 depict flowcharts of example operations for early construction of individuals in an evolutionary process with PRNG seeding.

At block 301, an initial generation of candidate solutions is created. For example, random candidate solutions can be generated as an initial population. The initial population may or may not include seed candidate solutions. Formal parameters N and M are used to track the generation under evaluation and an advanced generation being constructed early. The formal parameter N is initialized to 0 to represent the initial generation, and the formal parameter M is initialized to N+1.

At block 303, generation N is submitted for fitness evaluation. For example, an index to a structure that identifies all candidate solutions of generation N is passed to a process that computes the fitness values and evaluates the fitness values against termination criteria. Embodiments may pass an actual candidate solution or a reference to a candidate solution to the process or node carrying out fitness evaluation.

At block 305, it is determined whether M is greater than a maximum run. In case the termination criterion is not satisfied in a maximum number of permitted runs, the evolutionary process can be limited to the maximum number of permitted runs. If M is greater than the maximum number of allowable runs, then control flows to bock 307. If M is not greater than the maximum number of allowable runs, then control flows to block 311.

At block 307, the evolutionary process waits until fitness evaluation completes for generation N. After the fitness evaluation completes for generation N, the result is output at block 308.

If the maximum run will not be exceeded by generation M, then control flows to block 311. At block 311, it is determined whether an accelerate threshold has been met for generation M. An accelerate threshold defines a threshold number of candidate solutions to have been evaluated in generation N before early construction can begin for generation M. For example, a designer may define the accelerate threshold to be a function of the population size and/or tournament size (e.g., $\chi$times tournament size or $\chi$% of population size). If the accelerate threshold is not met for generation M, then the evolutionary processes waits at block 313. The evolutionary process can wait for any one of a number of cycles, a time period, a number of candidate solutions to be evaluated, etc. Control returns to block 311 from block 313.

If the accelerate threshold is met for generation M, then a tracking structure is instantiated for generation M at block 315. A variety of structures can be realized that track generation M. The structure can include or reference the candidate solutions generated for generation M. The structure also indicates state and fitness of the candidate solutions in generation M. Example structures are depicted in FIG. 1, although the structures in FIG. 1 are not intended to limit the possible embodiments or implementations.

At block 319, a generation seed for a PRNG is computed with a generation value that indicates or corresponds to generation N and an initial state seed. A variety of functions are possible for computing the generation seed that incorporate an indication of the generation for which the random numbers will be generated.

At block 321, the PRNG is seeded with the generation seed. The evolutionary process passes the generation seed to a function/method/procedure that initializes the PRNG with the generation seed.

At block 323, a genetic operator is selected and a number of tournament participants (X) is determined based on the genetic operator. In some cases, an evolutionary process may use a different genetic operator at certain iterations or even within an iteration. Different genetic operators operate upon a different number of individuals. For instance, crossover involves at least two individuals and mutation involves a single individual. A designer can define a tournament size as a function of the number of individuals needed for a genetic operator. Thus, tournament size may vary per individual. Control flows to block 401 of FIG. 4 from block 323.

At block 401, X random numbers are obtained from the PRNG. The random numbers can be obtained in accordance with a variety of techniques depending upon how the PRNG and the evolutionary process are implemented (e.g., X individual requests, a single request for X numbers, X calls/invocations of the PRNG, etc.).

At block 403, it is determined whether the candidate solutions in generation N corresponding to the obtained random numbers have been evaluated. If the candidate solutions have been evaluated, then control flows to block 407. Otherwise, control flows to block 405 to wait before control flows back to block 403. The part of the evolutionary process responsible for conducting the tournaments ("tournament process") waits for a configured amount of time, cycles, etc. Embodiments may also configure tournament program code to post a request to the fitness evaluator for notification when a given number of additional candidate solutions have completed fitness evaluation. Embodiments may also configure the fitness evaluator to independently notify the process responsible for tournaments and/or early construction each time a given number of candidate solutions complete fitness evaluation. The tournament/early construction process can count the notifications to determine whether a threshold number of candidate solutions have been evaluated to retry a tournament. As described earlier, a PRNG maintains an internal state which allows repeatability in sequence of random numbers generated after initialization or seeding. If all participants for a tournament are not evaluated and a tournament is later retried, the same random numbers will be obtained to ensure that the same participants are selected. Embodiments may choose to store random numbers along with indication of the corresponding generation and individual instead of running the PRNG again.

At block 407, winners of the tournament are selected.

At block 409, the candidate solution for generation M is constructed based on the winners of the tournaments and the genetic operator.

At block 410, it is determined whether the candidate solution is unique within generation M. If the candidate solution is not unique, then the candidate solution may be discarded and the tournament retried with a different set of random numbers. Thus, control flows back to block 401 if the candidate solution constructed at block 409 is not unique within generation M. If the early constructed candidate solution is unique within generation M, then control flows to block 411.

At block 411, the tracking structure for generation M is updated to indicate the constructed individual. For example, the tracking structure is populated with state of the constructed candidate solution (e.g., Constructed, Not Evaluated), and a reference to the constructed candidate solution. In addition, a counter of constructed individuals can be incremented.

At block 413, a completion check for generation N is performed.

At block 414, the constructed candidate solution is submitted for fitness evaluation. The constructed candidate solution may be placed in a queue of candidate solutions to be evaluated. The constructed candidate solution may be inserted directed into a queue, via messaging, by reference, etc. The constructed candidate solution may also be marked as early construction. If the evolutionary process allows fitness evaluation to be performed in parallel with determining whether a termination criterion has been satisfied, then the indication of early construction can guide the fitness evaluator to ensure the termination criterion has not been satisfied before evaluating early construction candidate solutions.

At block 415, it is determined whether generation M is complete. If generation M is not complete, then control flows back to block 323. If generation M is complete, then control flows to block 417.

At block 417, N is set to M and M is incremented. The update in parameters moves early construction to the next generation. The change in parameters N and M occur since generation M could not be completely constructed unless fitness evaluation completed for generation N. Control flows from block 417 to block 305.

Figure 5:
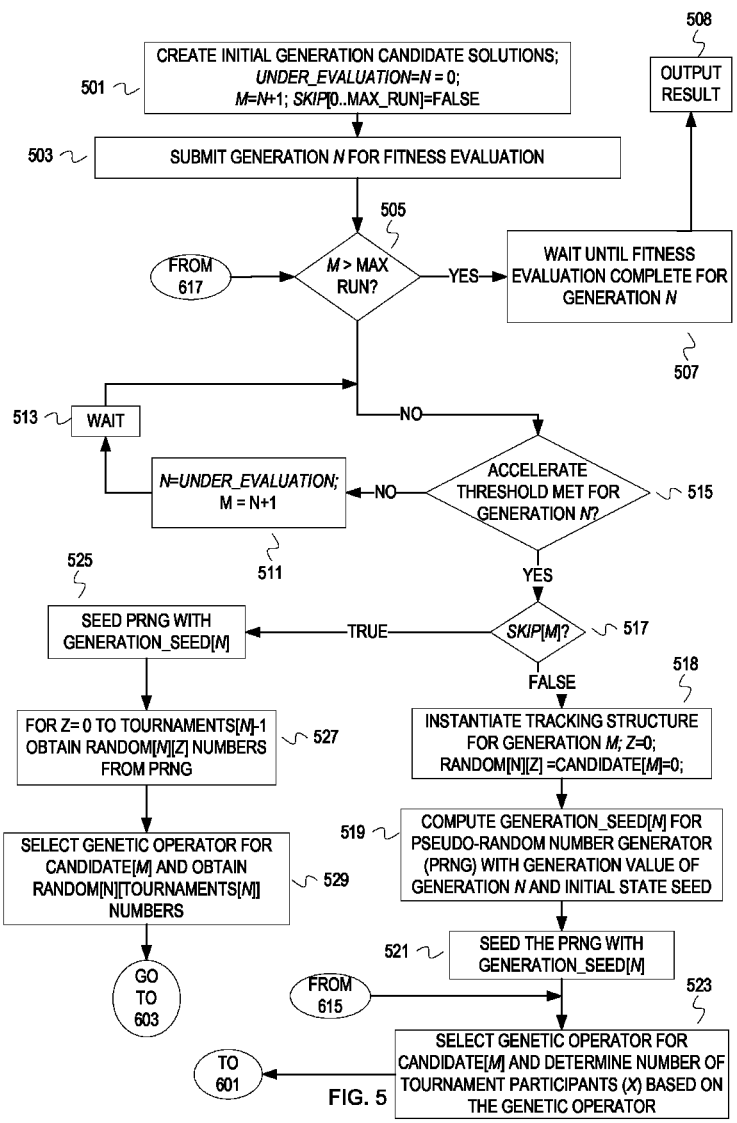
FIGS. 5-6 depict flowcharts of example operations that advance to later generations for early construction with seed manipulation.
Figure 6:
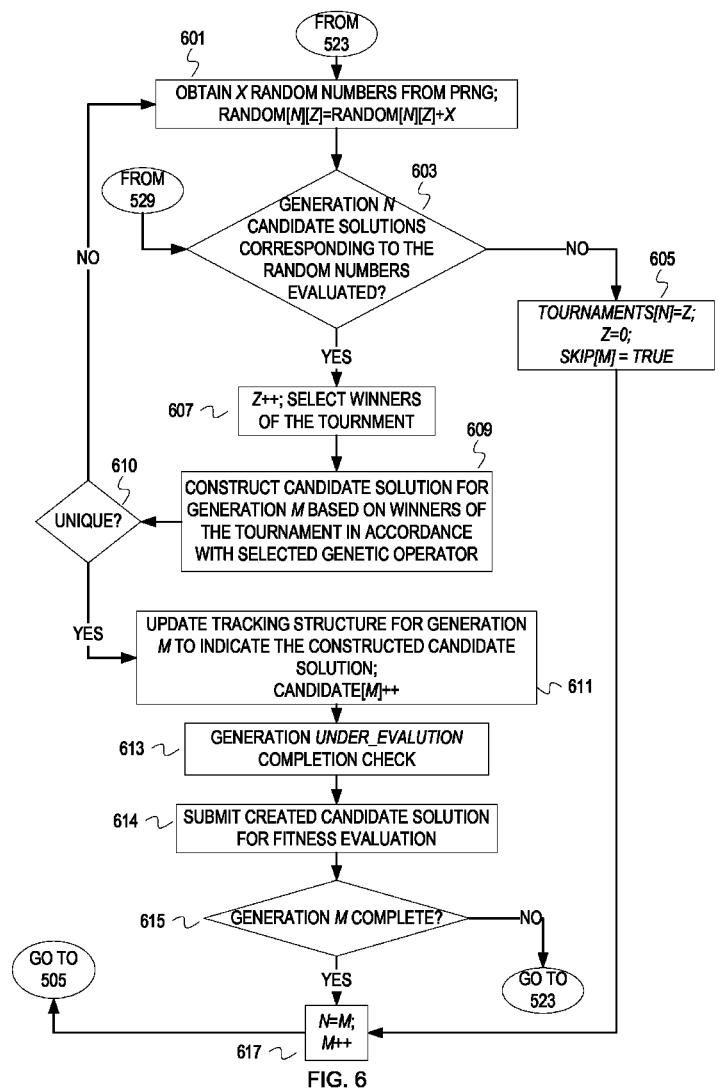

Although the example operations of FIGS. 3-4 wait when a tournament cannot be conducted, embodiments are not so limited. Without using speculative individuals or speculative fitness values, the early construction can continue advancing to later generations. In other words, multiple future generations can be under construction while a generation is still under evaluation. FIGS. 5-6 depict flowcharts of example operations that advance to later generations for early construction with seed manipulation.

At block 501, an initial generation of candidate solutions is created. In addition, formal parameters are initialized. UNDER_EVALUATION indicates the generation currently under evaluation. The formal parameters M and N are used to track generations involved with early construction. M is used in this example flowchart to track the generation being constructed early, and N is used in this example flowchart to track the generation sourcing candidate solutions for generation M. The formal parameters UNDER_EVALUATION and N are initialized to 0 corresponding to the initial generation. The formal parameter M is initialized to N+1. A structure of single bit flags SKIP[] (e.g., an array) of size MAX_RUN is initialized to FALSE or 0. This flag is used to mark when early construction has commenced for a generation and skipped to another generation because all tournament participants were not available (i.e., fitness evaluation not yet complete).

At block 503, the generation N is submitted for fitness evaluation.

At block 505, it is determined whether M is greater than a maximum run. In case the termination criterion is not satisfied in a maximum number of permitted runs, the evolutionary process can be limited to the maximum number of permitted runs. If M is greater than the maximum number of allowable runs, then control flows to bock 507. If M is not greater than the maximum number of allowable runs, then control flows to block 515.

At block 507, the evolutionary process waits until fitness evaluation completes for generation N. After the fitness evaluation completes for generation N, the result is output at block 508.

If the maximum run or iteration will not be exceeded by generation M, then control flows to block 515. At block 515, it is determined whether an accelerate threshold is met for generation N. As described in the previous flowcharts, the accelerate threshold can be configured in accordance with different techniques. If the accelerate threshold has not been met, then control flows to block 511. If the accelerate threshold is met, then control flows to block 517.

At block 511, parameters are set to indicate that the current generation under evaluation is sourcing the candidate solutions for the generation being constructed early. As long as the generation under evaluation is the initial generation, the parameters N and M are effectively being reinitialized to the same values. An implementation can simply check whether the generation UNDER_EVALUATION is still generation 0. If so, block 511 can be avoided. In later iterations, though, the setting of parameters in block 511 brings early construction back to the current generation from a later generation that is more than one iteration away when the accelerate threshold has not been met for that later generation.

At block 513, the process waits for a given time period or candidate solutions to try early construction again. Control flows from block 513 back to block 515. Implementations may not perform the wait at block 513 once the evolutionary process (or a deme) has progressed to a generation beyond early generations, such as generation 0. Instead of waiting, early construction will have advanced to later generations when possible.

If the accelerate threshold was met for generation N at block 515, then it is determined at block 517 whether the SKIP flag indicates TRUE or FALSE. If the flag indicates TRUE, then control flows to block 525. If the flag indicates FALSE, then control flows to block 518.

At block 518, a tracking structure is instantiated for generation M. As described with respect to block 315, a variety of structures can be realized that track generation M. The structure can include or reference the candidate solutions generated for generation M. The structure also indicates state and fitness of the candidate solutions in generation M. In addition, the following initializations are performed: a parameter Z is initialized to 0; a parameter RANDOM[N][Z] is initialized to 0; and a parameter CANDIDATE[M] is initialized to 0. For this example illustration, Z is used to track which tournaments have been conducted for a generation N. The parameter RANDOM[N][Z] is used to track the number of random numbers generated for tournament Z in generation N. The parameter CANDIDATE[M] is used to identify which candidate in generation M is being early constructed.

At block 519, a generation seed for a PRNG is computed with a generation value that indicates or corresponds to generation N and an initial state seed. A variety of functions are possible for computing the generation seed that incorporate an indication of the generation for which the random numbers will be generated.

At block 521, the PRNG is seeded with the generation seed. The evolutionary process passes the generation seed to a function/method/procedure that initializes the PRNG with the generation seed.

At block 523, a genetic operator is selected for CANDIDATE[M] and a number of tournament participants (X) is determined based on the genetic operator. As described with respect to block 323 earlier, tournament size can vary per individual based on the genetic operator for that individual. Control flows to block 601 of FIG. 6 from block 523.

At block 601, X random numbers are obtained from the PRNG. The random numbers can be obtained in accordance with a variety of techniques depending upon how the PRNG and the evolutionary process are implemented (e.g., X individual requests, a single request for X numbers, X calls/invocations of the PRNG, etc.). The parameter RANDOM[N][Z] is updated to indicate the number of random numbers generation for tournament Z in generation N (RANDOM[N][Z]=RANDOM[N][Z]+X).

At block 603, it is determined whether the candidate solutions in generation N corresponding to the obtained random numbers have been evaluated. If the candidate solutions have been evaluated, then control flows to block 607. Otherwise, control flows to block 605.

At block 607, the tournament tracker parameter Z is incremented and a winner or winners of the tournament are selected.

At block 609, the candidate solution for generation M is constructed based on the winners of the tournament and the genetic operator.

At block 610, it is determined whether the candidate solution is unique within generation M. If the candidate solution is not unique, then the candidate solution may be discarded and the tournament retried with a different set of random numbers. Thus, control flows back to block 601 if the candidate solution constructed at block 609 is not unique within generation M. If the early constructed candidate solution is unique within generation M, then control flows to block 611.

At block 611, the tracking structure for generation M is updated to indicate the constructed candidate solution. For example, the tracking structure is populated with state of the constructed candidate solution (e.g., Constructed, Not Evaluated), and a reference to the constructed candidate solution. In addition, the counter of constructed individuals in generation M CANDIDATE[M] is incremented.

At block 613, a completion check for generation UNDER_EVALUATION is performed.

At block 614, the constructed candidate solution is submitted for fitness evaluation. The variety of techniques for submitting a candidate solution as described with respect to block 314 is similarly applicable for block 614.

At block 615, it is determined whether generation M is complete. If generation M is not complete, then control flows back to block 523. If generation M is complete, then control flows to block 617.

At block 617, the parameters M and N are updated to track advancement of early construction (N=M; M++). Control flows from block 617 to block 505 of FIG. 5.

If it was determined at block 603 that all tournament participants had not been evaluated yet, then control flowed to block 605. At block 605, parameters are updated to reflect that early construction will advance to a next generation and early construction is not yet complete for generation M. A parameter TOURNAMENTS[N], which tracks tournaments conducted in a generation N, is set to Z. The tournament counter Z is reset to 0, and the SKIP[M] flag is set to TRUE to indicate that early construction is skipping ahead without completing construction at generation M. Control flows from block 605 to block 617.

Returning to block 517 where the SKIP[M] flag is evaluated, the SKIP flag will have been set to TRUE at block 605 because early construction skipped ahead without the generation under construction completing. If the SKIP[M] flag evaluates to TRUE, then control flows to block 525 where operations begin to restore state of the PRNG to the last tournament that failed (or was not conducted) in generation N.

At block 525, the PRNG is seeded with the previously computed seed GENERATION_SEED[N].

At block 527, a loop is run to generate the random numbers from the PRNG for each tournament that was previously conducted successfully in generation N. A loop control variable Z iterates from 0 to the number of conducted tournaments as represented by the parameter TOURNAMENTS[N]−1. The loop runs to one less than the number of tournaments because this example flowchart counts the last failed tournament in generation N the parameter TOURNAMENTS[N]. For each tournament that was conducted, a number of random numbers represented by the parameter RANDOM[N][Z] is obtained. This parameter indicates the number of random numbers generation for tournament Z in generation N.

At block 529, the genetic operator is selected for a candidate indicated by the parameter CANDIDATE[M], and random numbers amounting to a number indicated by the parameter RANDOM[N][TOURNAMENTS[N]] are obtained. Control flows from block 529 to block 603 of FIG. 6.

Figure 7:
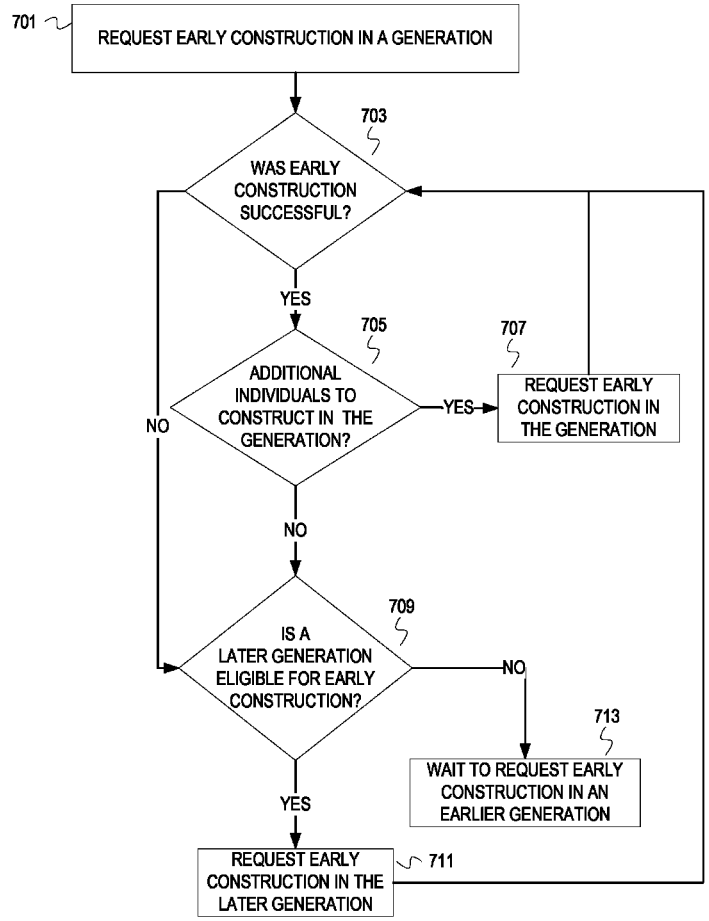
FIG. 7 depicts a flowchart of example operations for a managing entity to govern early construction.

Although FIGS. 5-6 integrate early construction with managing early construction, embodiments can separate the management from the early construction. A deme manager or global process manager can track state of demes and generations, including a number of evaluated candidate solutions in each deme of each generation. In that case, the managing entity can invoke an early construction function that accepts an indication of generation and deme as actual parameters. The early construction function can then proceed to the next unconstructed individual of the indicated deme in the indicated generation. Or the managing entity can specify individuals to be constructed. When responsibilities are split in this manner, the early construction function can return a value that indicates a tournament cannot be conducted or a value that indicates a threshold (e.g., accelerate threshold) is not satisfied instead of waiting. The managing entity governs when the early construction function can begin work again and the target deme and generation. FIG. 7 depicts a flowchart of example operations for a managing entity to govern early construction.

At block 701, early construction is requested in a generation.

At block 703, it is determined if the early construction was successful. If the tournament could not be conducted, then the early construction will not be successful. In some implementation, the managing process (e.g., deme manager) can determine whether a deme in a particular generation is eligible for early construction before requesting early construction (e.g., determining whether x individuals have been evaluated in the target deme of the target generation). If early construction was successful, then control flows to block 705. If not, then control flows to block 709.

At block 705, it is determined whether there are additional individuals to construct in the generation. An early construction may construct one candidate solution at a time or a predefined number of candidate solutions per request. The number of candidate solutions to construct early per request depends on a correspondence of potential resources being used for early construction of a generation beyond a termination point. In some implementations, the early construction function can continue constructing individuals until a tournament fails. If there are additional individuals to construct, then control flows to block 707. The managing process determines that the generation undergoing early construction is not yet complete, and again requests early construction for the generation at block 707.

If there were no additional individuals to construct early in the generation, then it is determined at block 709 if a later generation is eligible for early construction. A later generation can be eligible when a threshold number of candidate solutions in the preceding generation have been evaluated. Embodiments can define other criteria for eligibility, such as limiting how far early construction can advance ahead. If a later generation is not eligible for early construction, then control flows to block 713. If a later generation is eligible for early construction, then control flows to block 711.

At block 713, the managing process waits to request early construction in an earlier generation when a later generation is not eligible. In some cases, early construction may have begun in multiple generations beyond the generation currently undergoing evaluation. The managing process can wait for additional individuals to complete evaluation, and then request early construction again.

At block 711, the later generation is eligible so early construction is requested for the later generation. Control flows from block 711 to block 703.

Figure 8:
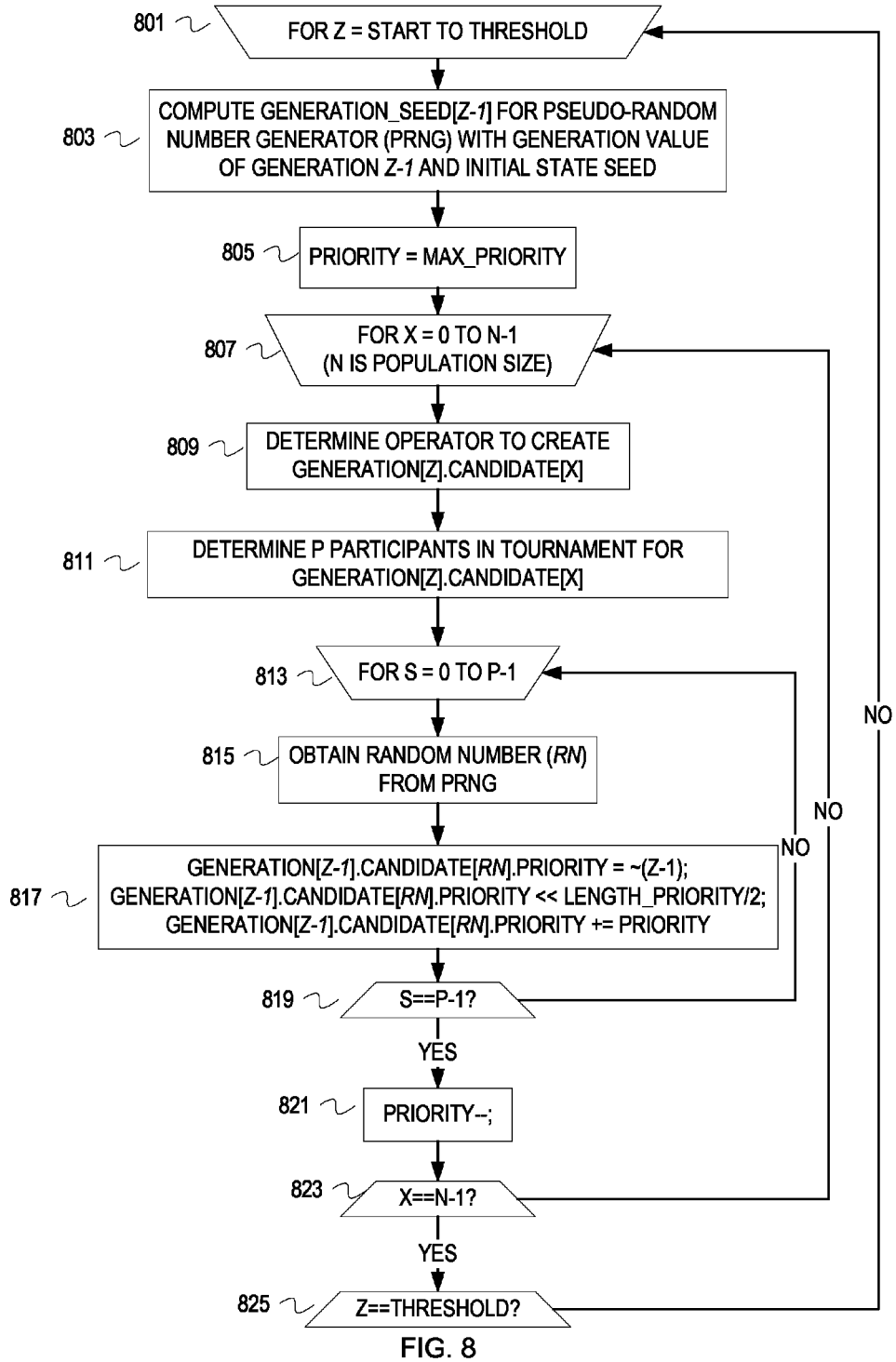
FIG. 8 depicts an example computer system with an evolutionary algorithm unit that implements early construction.

As noted above, early construction can be hindered when a tournament participant has not been evaluated. Since the random numbers that guide tournament selection are repeatable, the random numbers can be generated in advance to guide fitness evaluation order. The candidate solutions that will be selected for tournaments can be prioritized in accordance with order of their selection for tournament participation. Embodiments can define priority values for each candidate solution. Priority is given to candidate solutions of earlier generations, and then by order of tournaments. Priority need not be defined between candidate solutions within a same tournament. A single priority value can incorporate the generation and a value that corresponds to when the candidate solution is selected for a tournament. Greater weight can be given to the generation by setting aside the most significant bits of the priority value for the generation, and less significant bits for the value that corresponds to tournament selection. FIG. 8 depicts a flowchart of example operations for assigning priority values to candidate solutions to prioritize based on the random numbers that will guide tournament selection.

At block 801, a loop begins to set priority for each candidate solution of a generation. In this example, Z is the loop control variable. The loop will repeat from START to THRESHOLD. These parameters are defined by the programmer/designer. START can be generation 1 or a later generation, based on a premise that Z represents the generation to be constructed early and not the source generation. A programmer/designer may define THRESHOLD to be generation 8 to minimize resource consumption for computing priority. In addition, priority may be computed at later iterations. For instance, priority may be computed for generations 0 to 10, and then postponed until early construction begins to stall.

At block 803, a generation seed GENERATION_SEED [Z−1] is computed for a PRNG. As with the earlier flowcharts, the generation seed is computed as a function of an initial state seed and the source generation, which is generation Z−1 in this case although the semantics may vary as long as the seeds are unique across generations.

At block 805, the PRIORITY parameter is set to a MAX_PRIORITY, which represents a maximum boundary for priority. The developer of the evolutionary code or designer of the optimization problem can define the maximum priority value.

At block 807, another loop begins for each individual of generation Z. The loop control variable for this first nested loop is X. The loop will repeat from 0 to N−1, where N is the size of the population. In a multi-deme model, N would be the size of a sub-population.

At block 809, the genetic operator is determined for constructing the candidate GENERATION[Z].CANDIDATE [X].

At block 811, a number of participants, represented by the parameter P, in a tournament for GENERATION[Z].CANDIDATE[X] is determined.

At block 813, a second nested loop begins for each tournament participant. For the second nested loop, the loop control variable is S. The second nested loop will repeat for each tournament participant from 0 to P−1.

At block 815, a random number, represented by the parameter RN, is obtained from the PRNG.

At block 817, priority of the candidate solution of generation Z−1 that corresponds to the obtained random number is set. In this example illustration, the priority, represented by the parameter GENERATION[Z−1].CANDIDATE[RN] .PRIORITY is set as a one's complement of the generation Z−1. The ones complement operator is used to give lower generation numbers greater priority. The priority is then bit shifted over by half the length of the parameter. Finally, the value of PRIORITY is added to the parameter GENERATION[Z−1].CANDIDATE[RN].PRIORITY. The sequence of operations is only an example of operations that can be used to set priority to give greater weight to earlier generations and then to earlier selected tournament participants.

At block 819, it is determined whether all of the tournament participants have been processed (S==P−1). If the second nested loop does not terminate, then control flows back to block 813. Otherwise, control flows to block 821.

At block 821, the PRIORITY parameter is decremented. Embodiments can modify the PRIORITY in accordance with a variety of techniques to decrease priority for the next selected tournament participant. Embodiments can also assign the same priority to participants of the same tournament. For example, block 821 may be performed before block 819.

At block 823, the loop termination condition is evaluated for the first nested loop, which iterates through each individual of generation Z−1 (X==N−1). If the first nested loop does not terminate then control flows back to block 807. Otherwise, control flows on to block 825.

At block 825, the outer loop termination condition is evaluated. If all generations to be prioritized as defined by the START and THRESHOLD parameters have been prioritized, then the flow ends. If the termination condition (Z==THRESHOLD) is not satisfied, then control flows back to block 801.

Some Variations from Example Embodiments

The completion checks represented by FIG. 4 and FIG. 7 are not limited to determining whether a termination criterion has been satisfied. Embodiments can insert additional checks to determine whether the generation under evaluation has completed evaluation, and determine whether criteria for other disruptive actions (e.g., elitism, a cataclysm, etc.) are satisfied. Disruptive actions may be deterministic, though. For example, the evolutionary process may be configured to implement elitism at a particular generation or generations. In that case, early construction can be turned off for the particular generation or generations based on configuration information. In addition, an interrupt mechanism can be implemented instead of or in addition to formal checks.

Other variations can arise with respect to when early construction is activated or deactivated. FIG. 2 depicts conditioning activation of generation acceleration or early construction upon a threshold number of candidate solution completing fitness evaluation. Embodiments may also condition early construction upon the evolutionary process achieving a particular iteration. For instance, a designer can configure an evolutionary process to activate early construction when iteration 10 is achieved. Similarly, embodiments can deactivate early construction when an iteration is achieved. For example, a designer can configure an evolutionary process to deactivate early construction when 80% of the maximum runs have been achieved.

It should be appreciated that the flowcharts above are examples to aid in understanding the inventive subject matter. Embodiments can perform other operations, fewer operations, additional operations, operations in a different order, etc. For example, tournament size may not need to be determined as depicted in block 223 of FIG. 2 if the tournament size remains consistent throughout an evolutionary process. As another example of variation, the operations to compute a generation seed and initialize the PRNG as depicted in blocks 219 and 221 can be done by a separate process in parallel with the operations depicted at blocks 215 and 223.

Although the example Figures depict conducting a tournament of a tournament size sufficient to satisfy input for a genetic operator, embodiments may implement a tournament to select less than the number of input individuals for a genetic operator. For instance, an embodiment may select a single winner from each tournament. In this case, a tournament is conducted to determine each input individual for a genetic operator. If z tournaments are to be conducted for a genetic operator that takes z individuals as input and each tournament has a size s, then s*z random numbers will be obtained from the PRNG. Embodiments may choose to obtain the s*z random numbers in a batch instead of per tournament under these circumstances, although these circumstances are not a necessary condition for such an embodiment. If random numbers will be obtained across tournaments, embodiments will preserve the sequence of generation of the random numbers at least between tournaments. If a genetic operator for individual i of generation N takes p inputs, then p tournaments will be conducted for individual i. For a tournament size s, the PRNG will generate p*s random numbers. Although the order of generation of the first s random numbers need not be preserved, the tournament/early construction process will ensure the random numbers of the each successive group of s random numbers is not used before the preceding group or after any subsequent group. Preservation of order between tournaments preserves repeatability of the tournaments.

Another possible variation in embodiments relates to balancing storage resources against compute resources. Some of the values (e.g., generated random numbers, selected genetic operator for an individual, etc.) can be stored in a history of information once determined, and recalled when an early construction generation is revisited. Instead of running the PRNG again or re-executing the code that determines a genetic operator, for example, the information can be accessed. The volume of information can be large when working with a large population or numerous demes, so the problem designer or programmer will determine which resources is more scarce and choose an appropriate technique.

The example illustrations are presented in the context of a single deme model. In the case of multiple demes, operations similar to the example operations would be performed per deme. Early construction could advance at different rates per deme, and a function to compute the PRNG seeds would incorporate an indication of the deme as well as population. Additional operations may be performed to accommodate migration between demes. Candidate solutions constructed early can be marked as early construction and/or marked with an indication of the generation. If migration occurs for a generation, early construction can be implemented in different manners. If individuals migrate between demes in a generation N, then early construction of individuals for generation N+1 can be deactivated. Embodiments can also stop early construction at generation N+1 and delay sending early constructed individuals for fitness evaluation until the impact of migration is determined. If the number of migrants in generation N is configured to be m, then early construction can be stalled for any tournament with any one of the last m individuals of generation N. In addition, the evolutionary process can be designed or configured to implement migration last to allow other individuals to be early constructed beforehand. Further, a tournament for generation N+1 that includes an immigrant candidate solution can wait until the immigrant candidate solution arrives.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
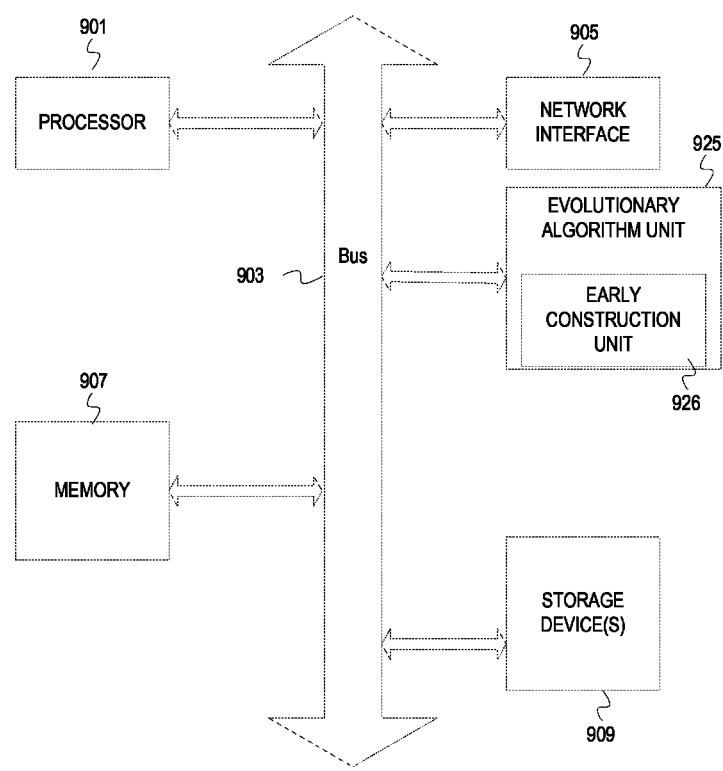
FIG. 9 depicts an example network of nodes carrying out a multi-deme model of an evolutionary process with early construction.

FIG. 9 depicts an example computer system with an evolutionary algorithm unit that implements early construction. A computer system includes a processor 901 (possibly including multiple processors, multiple cores, multiple nodes, and/or implementing multi-threading, etc.). The computer system includes memory 907. The memory 907 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 903 (e.g., PCI, ISA, PCI-Express, HyperTransport® bus, InfiniBand® bus, NuBus bus, etc.), a network interface 905 (e.g., an ATM interface, an Ethernet interface, a Frame Relay interface, SONET interface, wireless interface, etc.), and a storage device(s) 909 (e.g., optical storage, magnetic storage, solid state storage device, etc.). The computer system 901 also comprises an evolutionary algorithm unit 925, which includes an early construction unit 926. The evolutionary algorithm unit 925 may implement all aspects of an evolutionary process (e.g., candidate generation, fitness evaluation, etc.) or a subset of the functionality of an evolutionary process (e.g., candidate solution construction but not fitness evaluation). In addition, the evolutionary algorithm unit 925 may be assigned a local deme, carry candidate solution construction for that local deme, and report to a global manager that oversees multiple demes. The early construction unit 926 carries out early construction of candidate solutions for a generation beyond the earliest/oldest generation undergoing fitness evaluation when tournament participants are available from the source generation. Although depicted as a part of the evolutionary algorithm unit 925, the early construction unit 926 can be implemented separately from the evolutionary algorithm unit 925. The early construction unit 926 may be partially (or entirely) implemented in hardware and/or on the processor 901. For example, the functionality may be implemented with an application specific integrated circuit, in logic implemented in the processor 901, in a co-processor on a peripheral device or card, etc. Further, realizations may include fewer or additional components not illustrated in FIG. 9 (e.g., video cards, audio cards, additional network interfaces, peripheral devices, etc.). The processor 901, the storage device(s) 909, and the network interface 905 are coupled to the bus 903. Although illustrated as being coupled to the bus 903, the memory 907 may be coupled to the processor unit 901.

Figure 10:
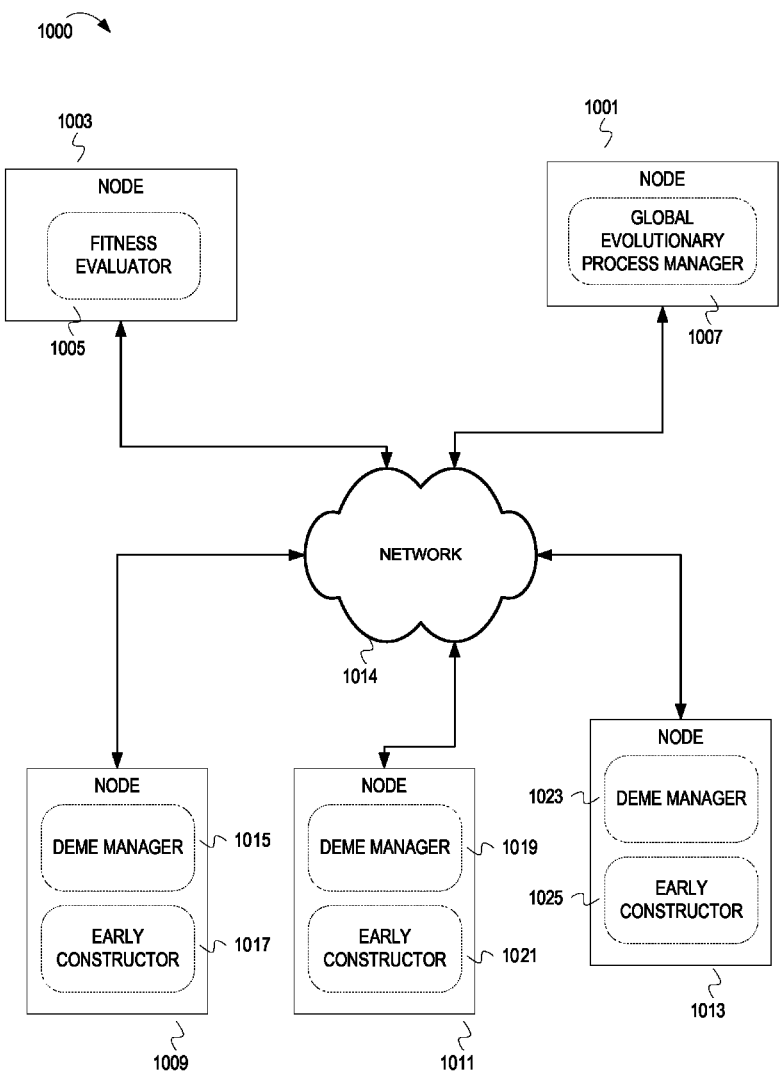
FIG. 10 depicts three nodes responsible for local demes.

FIG. 10 depicts an example network of nodes carrying out a multi-deme model of an evolutionary process with early construction. A network of nodes 1000 is depicted with several nodes communicatively coupled via a network 1014, which can be implemented in accordance with any of a variety of network technologies. A node 1001 hosts a global evolutionary process manager 1007. The evolutionary process manager 1007 allocates and manages resources for the evolutionary process and monitors progress and results of local demes. A node 1003 hosts a fitness evaluator 1005. The fitness evaluator 1005 runs simulations and computes fitness values.

FIG. 10 depicts three nodes responsible for local demes. A node 1009 hosts a deme manager 1015 and an early constructor 1017. A node 1011 hosts a deme manager 1019 and an early constructor 1021. A node 1013 hosts a deme manager 1023 and an early constructor 1025. The deme managers each generate initial local demes or sub-populations, unless assigned to them by the global evolutionary process manager 1007. Each of the deme managers reports progress of their local deme to the global evolutionary process manager periodically and/or in response to request from the global evolutionary process manager 1007. Each of the early constructors conduct tournaments for their respective local deme to begin early construction of a next generation while a current generation awaits completion of fitness evaluation. Although each of the early constructors can advance at their own rates dependent upon their local demes fitness evaluation, the global evolutionary process manager 1007 may stall an early construction to prevent any one deme from beginning early construction for a generation too far in advance of other demes, or at least neighboring demes to accommodate migration.

Each of the deme managers can invoke their corresponding early constructors in a manner similar to that depicted in FIG. 7. Each of the deme managers maintains state of their deme, and requests early construction by their early constructor when a sub-population is eligible for early construction. If a deme manager is notified that the process is to be terminated or disrupted (e.g., resource reallocation, evolutionary termination criterion is satisfied, user intervention, a cataclysm will be performed, etc.), the deme manager can interrupt the early constructor. The deme managers can be configured to balance the efficiencies from out of order early construction of individuals against the risk of spending resources on individuals that will not be evaluated. For instance, the deme manager can be configured to request early construction less frequently or pause early construction if the deme is far ahead of other demes or the evolutionary process is in later iterations near the maximum number of runs/iterations.

The network of nodes 1000 depicted in FIG. 10 is an example and can take different forms or configurations. For example, multiple nodes may carry out fitness evaluation. The network can be configured to assign a fitness evaluator for a given number of demes, or even per deme.

While the embodiments are described with reference to various implementations and exploitations, it will be understood that these embodiments are illustrative and that the scope of the inventive subject matter is not limited to them. In general, techniques for early construction of candidate solutions as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   while at least one candidate solution of a first generation of candidate solutions remains to be evaluated in accordance with a fitness function for an optimization problem, selecting a plurality of candidate solutions from the first generation of candidate solutions to participate in a tournament, wherein in response to a first candidate solution of the plurality of candidate solutions being of an earlier generation in comparison to a second candidate solution of the plurality of candidate solutions, the first candidate solution is given a higher priority than the second candidate solution that is used to prioritize selection;
   determining that each of the plurality of candidate solutions selected to participate in the tournament have been evaluated in accordance with the fitness function;
   selecting one or more winners of the tournament from the plurality of candidate solutions of the first generation of candidate solutions; and
   while at least one candidate solution of the first generation remains to be evaluated in accordance with the fitness function, creating a candidate solution of a second generation of candidate solutions with the selected one or more winners of the tournament in accordance with a genetic operator.

2. The method of claim 1 further comprising:
   selecting a second plurality of candidate solutions from the first generation of candidate solutions to participate in a second tournament;
   determining that at least one of the second plurality of candidate solutions selected to participate in the second tournament has not yet been evaluated in accordance with the fitness function; and
   waiting for an indication that the at least one of the second plurality of candidate solutions selected to participate in the tournament has been evaluated in accordance with the fitness function.

3. The method of claim 1 further comprising:
   selecting a second plurality of candidate solutions from the first generation of candidate solutions to participate in a second tournament;
   determining that at least one of the second plurality of candidate solutions selected to participate in the second tournament has not yet been evaluated in accordance with the fitness function; and
   beginning early construction of candidate solutions for a third generation of candidate solutions, wherein the third generation is later than the second generation.

4. The method of claim 1 further comprising:
   computing a seed for a pseudo random number generator for each generation and deme, wherein the seed is unique across generations and demes;
   initializing the pseudo random number generator when early construction of candidate solutions begins or resumes for a generation; and
   if early construction resumes for a given generation, then obtaining random numbers from the pseudo random number generator until returning to a state when a tournament of the given generation could not be conducted.

5. The method of claim 1 further comprising:
   determining in advance the random numbers that indicate the plurality of candidate solutions selected to participate in the tournament; and
   prioritizing fitness evaluation for the plurality of candidate solutions of the first generation over other candidate solutions of the first generation that are either not known to participate in any tournament or selected to participate in later tournaments.

6. The method of claim 1 further comprising:
   computing a seed for a pseudo random number generator for each candidate solution, wherein the seed is unique across candidate solutions and across generations;
   initializing the pseudo random number generator when early construction of each candidate solution begins or resumes; and
   if early construction resumes for a given candidate solution, then obtaining random numbers from the pseudo random number generator until returning to a state when a tournament of the given candidate solution could not be conducted.

7. A computer program product for early construction of candidate solutions, the computer program product comprising:
   a computer readable storage device having computer usable program code embodied therewith, the computer usable program code comprising a computer usable program code configured to:
      select a plurality of candidate solutions from a first generation of candidate solutions to participate in a tournament, wherein in response to a first candidate solution of the plurality of candidate solutions being of an earlier generation in comparison to a second candidate solution of the plurality of candidate solutions, the first candidate solution is given a higher priority than the second candidate solution that is used to prioritize selection;
      determine whether each of the plurality of candidate solutions selected to participate in the tournament have been evaluated in accordance with the fitness function;
      select one or more winners of the tournament from the plurality of candidate solutions of the first generation of candidate solutions; and
      while at least one candidate solution of the first generation remains to be evaluated in accordance with the fitness function, create a candidate solution of a second generation of candidate solutions with the selected one or more winners of the tournament in accordance with a genetic operator.

8. The computer program product of claim 7 further comprising computer usable program code configured to:
   select a second plurality of candidate solutions from the first generation of candidate solutions to participate in a second tournament;
   determine that at least one of the second plurality of candidate solutions selected to participate in the second tournament has not yet been evaluated in accordance with the fitness function; and
   wait for an indication that the at least one of the second plurality of candidate solutions selected to participate in the tournament has been evaluated in accordance with the fitness function.

9. The computer program product of claim 7 further comprising computer usable program code configured to:

select a second plurality of candidate solutions from the first generation of candidate solutions to participate in a second tournament;

determine that at least one of the second plurality of candidate solutions selected to participate in the second tournament has not yet been evaluated in accordance with the fitness function; and begin early construction of candidate solutions for a third generation of candidate solutions, wherein the third generation is later than the second generation.

10. The computer program product of claim 7 further comprising computer usable program code configured to:

compute a seed for a pseudo random number generator for each generation and deme, wherein the seed is unique across generations and demes;

initialize the pseudo random number generator when early construction of candidate solutions begins or resumes for a generation; and if early construction resumes for a given generation, then obtain random numbers from the pseudo random number generator until returning to a state when a tournament of the given generation could not be conducted.

11. The computer program product of claim 7 further comprising computer usable program code configured to:

determine in advance the random numbers that indicate the plurality of candidate solutions selected to participate in the tournament; and prioritize fitness evaluation for the plurality of candidate solutions of the first generation over other candidate solutions of the first generation that are either not known to participate in any tournament or selected to participate in later tournaments.

12. The computer program product of claim 7 further comprising computer usable program code configured to:

compute a seed for a pseudo random number generator for each candidate solution, wherein the seed is unique across candidate solutions and across generations;

initialize the pseudo random number generator when early construction of each candidate solution begins or resumes; and if early construction resumes for a given candidate solution, then obtain random numbers from the pseudo random number generator until returning to a state when a tournament of the given candidate solution could not be conducted.

13. An apparatus comprising:

a processor; and a computer readable storage medium coupled with the processor, the computer readable storage medium having computer usable program code embodied therewith, the computer usable program code comprising a computer usable program code configured to:

select a plurality of candidate solutions from a first generation of candidate solutions to participate in a tournament, wherein in response to a first candidate solution of the plurality of candidate solutions being of an earlier generation in comparison to a second candidate solution of the plurality of candidate solutions, the first candidate solution is given a higher priority than the second candidate solution that is used to prioritize selection;

determine whether each of the plurality of candidate solutions selected to participate in the tournament have been evaluated in accordance with the fitness function;

select one or more winners of the tournament from the plurality of candidate solutions of the first generation of candidate solutions; and while at least one candidate solution of the first generation remains to be evaluated in accordance with the fitness function, create a candidate solution of a second generation of candidate solutions with the selected one or more winners of the tournament in accordance with a genetic operator.

14. The apparatus of claim 13 further comprising computer usable program code configured to:

select a second plurality of candidate solutions from the first generation of candidate solutions to participate in a second tournament;

determine that at least one of the second plurality of candidate solutions selected to participate in the second tournament has not yet been evaluated in accordance with the fitness function; and wait for an indication that the at least one of the second plurality of candidate solutions selected to participate in the tournament has been evaluated in accordance with the fitness function.

15. The apparatus of claim 13 further comprising computer usable program code configured to:

select a second plurality of candidate solutions from the first generation of candidate solutions to participate in a second tournament;

determine that at least one of the second plurality of candidate solutions selected to participate in the second tournament has not yet been evaluated in accordance with the fitness function; and begin early construction of candidate solutions for a third generation of candidate solutions, wherein the third generation is later than the second generation.

16. The apparatus of claim 13 further comprising computer usable program code configured to:

compute a seed for a pseudo random number generator for each generation and deme, wherein the seed is unique across generations and demes;

initialize the pseudo random number generator when early construction of candidate solutions begins or resumes for a generation; and if early construction resumes for a given generation, then obtain random numbers from the pseudo random number generator until returning to a state when a tournament of the given generation could not be conducted.

17. The apparatus of claim 13 further comprising computer usable program code configured to:

determine in advance the random numbers that indicate the plurality of candidate solutions selected to participate in the tournament; and prioritize fitness evaluation for the plurality of candidate solutions of the first generation over other candidate solutions of the first generation that are either not known to participate in any tournament or selected to participate in later tournaments.

18. The apparatus of claim 13 further comprising computer usable program code configured to:

compute a seed for a pseudo random number generator for each candidate solution, wherein the seed is unique across candidate solutions and across generations;

initialize the pseudo random number generator when early construction of each candidate solution begins or resumes; and if early construction resumes for a given candidate solution, then obtain random numbers from the pseudo random number generator until returning to a state when a tournament of the given candidate solution could not be conducted.

* * * * *